Patented Aug. 25, 1953

2,650,245

UNITED STATES PATENT OFFICE 2,650,245

SYNTHESIS OF ACETIC ACID FROM CO AND METHANOL

Edward Boaden Thomas and Edmund Harry Alcock, Spondon, near Derby, England, assignors to British Celanese Limited, a corporation of Great Britain No Drawing. Application March 23, 1950, Serial No. 151,528. In Great Britain April 8, 1949

5 Claims. (Cl. 260—532)

This invention relates to improvements in the synthesis of organic compounds and is, more particularly, concerned with the manufacture of acetic acid.

U. S. Patent No. 1,864,643 describes subjecting carbon monoxide to reaction with methanol to form acetic acid in the presence of an inorganic acid or an inorganic acid containing an organic group, the acid being employed as such or in the form of an acid salt. The preferred catalyst is phosphoric acid and the preferred temperature is from 300° to 400° C. The patent indicates that the methanol used can be produced by subjecting carbon monoxide and hydrogen to reaction in the presence of a methanol-forming catalyst and the products obtained passed directly into contact with the acid catalyst for the production of acetic acid. However, the products of the methanol synthesis always contain unused hydrogen and it is found in practice that this hydrogen exerts a repressive influence on the acetic acid synthesis when carried out in the manner described in this patent, so that it has always heretofore been regarded as best to separate the methanol produced from the products of reaction between carbon monoxide and hydrogen and to subject it to reaction with carbon monoxide in the absence of hydrogen for producing acetic acid.

Recently, it has been found that the production of acetic acid by reaction between methanol and carbon monoxide can be catalysed at 260° to 360° C. by nickel iodide (see B. I. O. S. Final Report No. 1558) or by the joint use of a carbonyl and iodine (see F. I. A. T. Final Report No. 933). Investigation of the use of nickel iodide or of nickel carbonyl and iodine has shown that considerable destruction of the starting material occurs with the formation of methane, especially if hydrogen is present, in which case it is common for substantially more than one molecule of methane to be produced for each molecule of acetic acid. Such a result is, of course, quite uneconomic.

According to the present invention, acetic acid is produced by subjecting methanol to reaction with carbon monoxide under high superatmospheric pressure at a temperature below 200° C. and in presence of water and an iodide of one of the carbonyl-forming metals nickel, cobalt and iron. Surprisingly, it has been found that, operating under these conditions, conversion to acetic acid can be maintained at an economic level with negligible methane formation even in the presence of hydrogen, which does not appear to exert any repressive influence on the acetic acid-forming reaction. The invention thus enables acetic acid to be produced directly from the products obtained by reacting carbon monoxide and hydrogen in presence of a methanol-forming catalyst without separation of the methanol in a more efficient manner than is possible with the catalysts disclosed in the prior patent referred to above. In this connection it is to be noted that the relatively low temperatures used in the process of the invention represent a substantial heat economy, while the avoidance of substances as corrosive as phosphoric acid is obviously advantageous.

Of the catalysts which can be used in carrying out the process of the invention, nickel iodide is most active, and the invention will be described more particularly in connection with its use. Cobalt iodide is substantialy less active but is more active than an iodide of iron. In addition to the carbonyl-forming metals mentioned, certain other metals and in particular tungsten and metals of the fifth group of the periodic system, namely vanadium, antimony and bismuth, have also been found to catalyse the production of acetic acid to a useful degree, providing there is also present an iodide of nickel, cobalt or iron.

In carrying out the synthesis of acetic acid the nickel iodide is present in the reaction zone in both the hydrated and anhydrous, i. e. unhydrated, form. Although the reaction can be started up with the hydrated form of nickel iodide present as the sole catalyst, during the operation of the process part of this nickel iodide loses its water of crystallisation. It is, indeed, preferred to have present some of the anhydrous nickel iodide even at the beginning of the process, quite a small proportion being sufficient to ensure rapid initiation of the reaction, e. g. a quantity equal to about 5 mole percent based on the amount of the hydrated iodide present, although larger quantities, e. g. up to 10 or 20% or more, may be present.

The reaction may be initiated simply by charging the reaction vessel with hydrated nickel iodide, preferably containing a small quantity of anhydrous nickel iodide, raising the reaction vessel to reaction temperature, and introducing the carbon monoxide and methanol. However, if desired, the initial charge may contain some acetic acid, but in this case it is found desirable to have present even at the start of the reaction substantially more of the anhydrous nickel iodide, and the best results have been obtained using equal weights of the nickel iodide hexahydrate, anhydrous nickel iodide and acetic acid. It will thus be appreciated that it is desirable to maintain in the reaction zone a high concentration of the catalyst. The proportions indicated above are equivalent to the use of a reaction mixture containing approximately 33% of acetic acid as the initial charge. In general, good results have been obtained when the acetic acid, either initially or during the progress of the process, represents from 30 to 50% by weight of the contents of the reaction vessel. The water which has been found essential for the satisfactory operation of the process can be provided entirely by the use of a sufficient quantity of nickel iodide hexahydrate in the reaction zone. The use, as initial charge in the reaction zone, of hydrated nickel iodide containing 5 mole percent of the anhydrous salt corresponds to the use of a quantity of water equal to approximately 30% of the weight of nickel iodide used, assuming all the nickel iodide to be anhydrous. The use of an initial charge consisting of equal weights of the hexahydrate, anhydrous nickel iodide and acetic acid is equivalent to the use of an amount of water equal to approximately 15% of the weight of nickel iodide used, assuming all the nickel iodide to be anhydrous. Generally it is preferred to use a quantity of water equal to 15 to 30% on the weight of the nickel iodide used, assuming the nickel iodide to be anhydrous. Similar amounts of water may be used with the iodides of cobalt and iron. Larger quantities of water may, however, be used, in which case the acetic acid formed may be recovered in less concentrated form but the corrosive nature of the contents of the reaction vessel is reduced.

During the operation of the process, except where it is carried out as a batch process in a closed vessel, there is some danger of loss of catalyst by formation of nickel carbonyl, methyl iodide and free iodine. All of such products are sufficiently volatile for them to be lost from the reaction vessel in quite large quantities unless precautions are taken. To this end an efficient reflux condenser should be fitted to the reaction vessel. Such volatile products as do escape, and likewise the same products separated from the acetic acid withdrawn from the reaction vessel as product, can be treated for the recovery of the nickel and iodine present and these elements used for re-forming nickel iodide to be used as catalyst in the process. However, as an alternative the nickel carbonyl, iodine and methyl iodide may be returned as such to the reaction vessel to maintain the concentration of catalyst, since it appears that nickel carbonyl, iodine and methyl iodide all form essential links in the chain between methanol and acetic acid and, indeed, the reaction itself can be catalysed by nickel carbonyl and iodine just as it can be catalysed by nickel iodide itself, so that for the purposes of the invention a carbonyl and iodine, or a compound yielding iodine under the reaction conditions, can be regarded as equivalent to an iodide of the carbonyl-forming metal.

As previously indicated, the synthesis of acetic acid is carried out in accordance with the present invention under high superatmospheric pressure at a temperature below 200° C. In general pressures of between 100 and 400 atmospheres are satisfactory, pressures of 250 to 350 atmospheres being preferred, while the temperatures used may be between 130° and 190° C.

Under the reaction conditions used the reaction vessel contains at least one liquid phase, comprising acetic acid, and usually a second liquid phase comprising methyl iodide, nickel carbonyl and a little methanol. In addition some of the catalyst is in solution but quite a large part of it is present as a finely divided solid. The carbon monoxide is, of course, present in the gaseous phase and thus, for efficient performance of the process, it is essential to ensure adequate mixing of gas, liquid and solid phases. In order to achieve this object stirrers may be employed in the reaction vessel or the reaction vessel itself may be agitated, or the contents of the reaction vessel may be circulated by pumps or other means, for example, between the reaction vessel and a point at which a side stream is taken off for the separation of acetic acid produced.

The methanol to be used in the process of the invention can, as already indicated, be most conveniently synthesised from carbon monoxide and hydrogen. The methanol synthesis stage can be carried out in the manner normally employed for this synthesis, for instance using a zinc oxide or zinc chromate type of catalyst at temperatures of the order of 300° to 400° C. and under superatmospheric pressure, e. g. of 100 to 400 atmospheres. It is most convenient to employ a pressure of the same order as that to be used in the acetic acid synthesis so that the products can pass directly from the methanol synthesis vessel to the acetic acid synthesis vessel.

The product of methanol involves reaction between two molecules of hydrogen with each molecule of carbon monoxide. According to one method of operating the combined process, the methanol synthesis stage is initiated with a gas mixture containing carbon monoxide and hydrogen in the stated proportions, but thereafter the operation of the process is continued by recycling unchanged gas issuing from the acetic acid synthesis together with make-up gas containing carbon monoxide and hydrogen in equimolecular proportions. The make-up gas can be introduced after the methanol synthesis stage and before the products from this stage are introduced into the acetic acid production stage or before the recycle gas is re-introduced into the methanol synthesis stage, or at both points. Operating in this way has the advantage that once the process has been started up the gas supplied can be water gas which has merely been suitably purified but which has not had to be subjected to ratio adjustment to enrich it with one or other of its main constituents. If desired, however, the process may be started up and continued with water gas.

It has been found in practice convenient to operate the methanol synthesis so as to achieve a conversion to methanol of the order of 20 to 30%. Such a result can be achieved very easily operating at 300° to 320° C. and a pressure of about 300 atmospheres with a contact time of less than 10 minutes, e. g. 5 to 6 minutes, using a zinc chromate type of catalyst, preferably one of the composition $4\text{-}5ZnO, Cr_2O_3$. When operating in this way and passing the products directly to the acetic acid synthesis, it is possible to achieve an over-all conversion of the carbon monoxide to acetic acid of 30 to 50%, according to the conditions employed in the acetic acid synthesis, with yields well above 80%. With a view to obtaining such conversion and yields it has been found best to use in the acetic acid stage a contact time of rather more than an hour, e. g. 1½ to 2 hours, the contact time being calculated on the assumption that there is available as reaction space the whole volume of a reaction vessel containing ¼ to ½ of its volume of liquid and solid materials.

The invention has been described as a novel method of synthesising acetic acid. The reaction involved, is however, one which is general to reaction between carbon monoxide and aliphatic hydroxy compounds, and the invention may be applied, therefore, not only to the manufacture of acetic acid but to the production of aliphatic acids from hydroxy compounds other than methanol. Thus, monohydric alcohols containing more than one carbon atom may be subjected to reaction with carbon monoxide under the conditions described in this specification, and in this way, for example, propionic acid may be produced from ethyl alcohol. Polyhydric alcohols may also be employed as starting materials for the production of polybasic acids, for example 1.4-butane diol, when subjected to reaction with carbon monoxide under the conditions described, yields adipic acid. The invention includes within its scope the manufacture of aliphatic acids in general by such reactions.

The following examples illustrate the invention:

Example 1

A gas mixture of the composition $2H_2:CO$ was passed at 300 atmospheres pressure into a copper lined stainless steel reaction vessel charged with a catalyst having the composition $4.8\ ZnO,Cr_2O_3$ in the form of tablets prepared from the co-precipitated basic carbonates of zinc and chromium. Using a contact time of 5 to 6 minutes at a temperature of 310° C. the conversion of the mixture of hydrogen and carbon monoxide is usually of the order of 24 to 26%.

The products issuing from this reaction vessel are passed through a short conduit into a second stainless steel reaction vessel provided with a paddle stirrer operating at 650 R. P. M. containing equal weights of hydrated nickel iodide, anhydrous nickel iodide and acetic acid and heated to a temperature of 170° C. The pressure in this vessel was also maintained at 300 atmospheres, the outlet from the vessel leading to a reflux condenser and thence to a second condenser provided with a receiver and gas discharge. Normally in operation no condensate is obtained in this receiver.

With the conditions maintained as indicated for a period of three hours, the contents of the second reaction vessel increased in weight by 20 to 25%. Distillation of these contents yields a quantity of acetic acid showing an over-all conversion of the carbon monoxide charged to the process of some 35% with a yield on the carbon monoxide of approximately 70%. Part of this acetic acid is recovered in the form of methyl acetate and the products include also methanol, dimethyl ether and a little methyl iodide and nickel carbonyl. The gaseous products, besides unchanged carbon monoxide, include a little carbon dioxide and methane.

Example 2

The process is carried out in the manner indicated in Example 1 but using a reaction temperature of 315° to 325° C. and a contact time of 4½ minutes in the methanol-forming stage, and a reaction temperature of 170° to 175° C. in the acetic acid-forming stage. The second reactor is charged initially with hydrated nickel iodide, together with about 4% of its weight of anhydrous nickel iodide.

After a period of about three hours the contents of the reaction vessel are discharged and distilled. The acetic acid produced represents a conversion of nearly 55% on the carbon monoxide introduced with a yield on the carbon monoxide of about 80%. After distilling the acetic acid a residue remains consisting of a mixture of hydrated and anhydrous nickel iodide. This residue is mixed with acetic acid and water and also with methyl iodide and nickel carbonyl obtained as first runnings during the distillation of the acetic acid to produce a product consisting of 572 parts by weight of nickel iodide (calculated as the anhydrous salt), 325 parts of acetic acid, 78 parts of water, 10 parts of methyl iodide and 5 parts of nickel carbonyl. The second reaction vessel is charged with this mixture and the product of the methanol synthesis introduced as before, the second reaction vessel being maintained at 170° to 175° C. Under these conditions the conversion to carbon monoxide after a period of about three hours is again about 55%, but the gaseous products include rather smaller quantities of carbon dioxide and methane so that the yield based on the carbon monoxide approaches 90%. As before, distillation of the actic acid leaves a residue which can be used for charging the second reactor for a further stage in the process after the addition of suitable quantities of acetic acid and water.

Having described our invention, what we desire to secure by Letters Patent is:

1. Process for the production of free acetic acid by reaction between methanol and carbon monoxide under high superatmospheric pressure, which comprises heating together methanol, carbon monoxide and hydrogen and a preformed mixture of hydrated and unhydrated nickel iodide, at least one mole of hydrogen being present for each mole of carbon monoxide, and repressing methane formation by maintaining the temperature in the reaction zone below 200° C.

2. Process for the production of free acetic acid by reaction between methanol and carbon monoxide under high superatmospheric pressure, which comprises heating together to a temperature between 130 and 190° C. methanol, carbon monoxide and hydrogen and a preformed mixture of hydrated and unhydrated nickel iodide, at least one mole of hydrogen being present for each mole of carbon monoxide.

3. Process for the production of free acetic acid by reaction between methanol and carbon monoxide under high superatmospheric pressure, which comprises heating together to a temperature between 130 and 190° C. methanol, acetic acid, carbon monoxide and hydrogen and a preformed mixture of hydrated and unhydrated nickel iodide, at least one mole of hydrogen being present for each mole of carbon monoxide, maintaining reaction conditions until the quantity of acetic acid in the reaction zone has been substantially increased, and thereafter recovering acetic acid from the reaction product.

4. Process according to claim 3, wherein a mixture initially containing approximately equal parts by weight of acetic acid, hydrated nickel iodide and anhydrous nickel iodide is subjected to reaction with the methanol and carbon monoxide in the presence of hydrogen and is maintained under reaction conditions until more than 50% by weight of the mixture contained in the reaction zone is acetic acid.

5. Process for the production of free acetic acid by reaction between methanol and carbon monoxide at a pressure between 250 and 350 atmospheres, which comprises heating together methanol, carbon monoxide and hydrogen and a preformed mixture of hydrated and unhydrated nickel iodide, at least one mole of hydrogen being present for each mole of carbon monoxide, and repressing methane formation by maintaining the temperature in the reaction zone below 200° C.

EDWARD BOADEN THOMAS.
EDMUND HARRY ALCOCK.

References Cited in the file of this patent

UNITED STATES PATENTS

| Number | Name | Date |
|---|---|---|
| 1,946,256 | Woodhouse | Feb. 6, 1934 |
| 2,448,368 | Gresham et al. | Aug. 31, 1948 |
| 2,457,204 | Brooks | Dec. 28, 1948 |

OTHER REFERENCES

Peck et al.: "Interview with Dr. J. W. Reppe," Fiat Final Report No. 273, pp. 9–11 (October 2, 1945).

Reppe: "Acetylene Chem.," P. B. Report 18852-S (Chas. A. Meyer and Co., Inc.), page 172 (1949).